J. A. STUMPENHORST.
MOTOR VEHICLE DRIVING MECHANISM.
APPLICATION FILED AUG. 14, 1920.
1,396,074.
Patented Nov. 8, 1921.
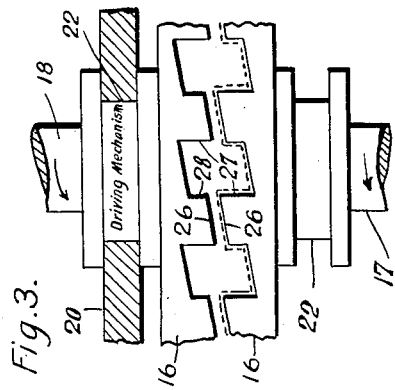
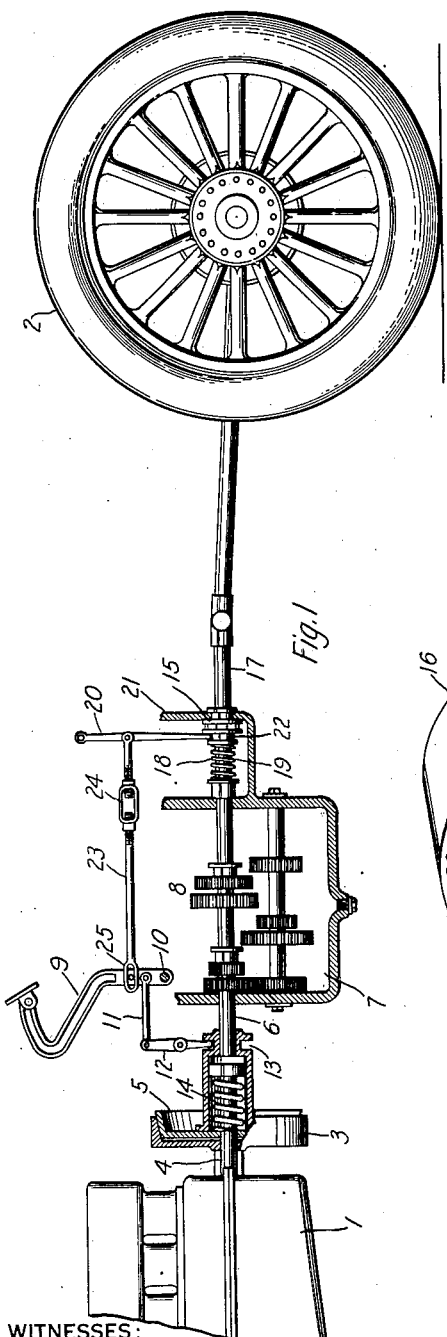
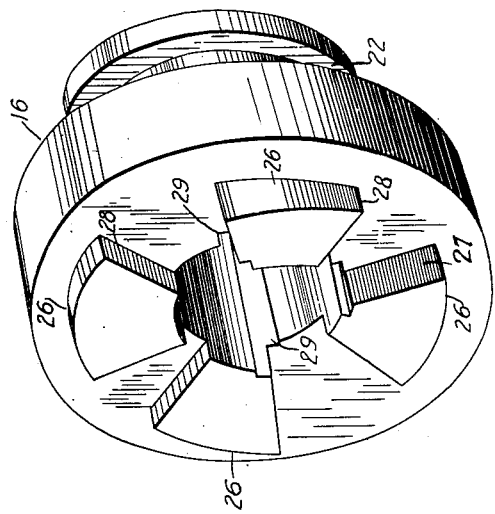
WITNESSES:
INVENTOR
John A. Stumpenhorst
BY
ATTORNEY

UNITED STATES PATENT OFFICE.

JOHN A. STUMPENHORST, OF WILKINSBURG, PENNSYLVANIA.

MOTOR-VEHICLE DRIVING MECHANISM.

1,396,074.   Specification of Letters Patent.   Patented Nov. 8, 1921.

Application filed August 14, 1920. Serial No. 403,564.

*To all whom it may concern:*

Be it known that I, JOHN A. STUMPENHORST, a citizen of the United States, and a resident of Wilkinsburg, in the county of Allegheny and State of Pennsylvania, have invented a new and useful Improvement in Motor-Vehicle Driving Mechanisms, of which the following is a specification.

My invention relates to motor vehicles and particularly to power transmitting mechanisms for such vehicles and it has for one of its objects to provide means for disconnecting the change-speed gears of motor vehicles from the driven member of such vehicles at the time the gears are changed.

Another object of my invention is to so arrange the above means that the change-speed gears may not be reconnected to the driven member except under predetermined conditions as to rotative speed of the coöperating parts.

Another object is to provide a disconnecting means comprising a positive-action clutch, not dependent upon friction for its operation, that shall be simple and relatively small and inexpensive.

In practising my invention, I provide, in addition to the usual main clutch, a multiple jaw clutch located between the change-speed gearing and the driven shaft, and actuate the same by means of a lever and a rod connected to the main clutch-pedal lever. The connecting rod has a lost-motion slot incorporated therein and is provided also with means whereby its length may be adjusted. By reason of the lost-motion slot, the operator may actuate the main clutch alone, if desired, under ordinary service conditions and may actuate the multiple-jaw clutch under emergency conditions in combination with the main clutch.

I provide embodying means on said multiple-jaw clutch for permitting the reconnection of the coöperating parts of said clutch only under predetermined conditions as to the relative speed of the two parts and resilient means for causing the reconnection under said conditions.

Referring to the single sheet of drawings,

Figure 1 is a diagrammatic view, partly in side elevation and partly in section, of the driving mechanism of a motor vehicle in which is incorporated the device embodying my invention, Fig. 2 is a perspective view of one of the two parts of the multiple-jaw clutch used in the device embodying my invention and Fig. 3 is a developed view of the two-part jaw clutch, one element of which is illustrated in Fig. 2.

Referring to Fig. 1, an engine 1 of any standard design operates to drive an automotive vehicle, here represented by a rear or driving wheel 2. One part of a standard clutch 3 is mounted on an extension 4 of the engine shaft and a coöperating clutch member 5 is mounted on a short shaft 6, one end of which extends into a casing 7 which contains a standard set of change-speed gears here designated as a unit by the reference numeral 8. The main clutch member 5 is actuated by means of a clutch pedal lever 9 that is pivotally mounted on a rock shaft 10 which is suitably supported on some part of the vehicle or on the casing 7. A connecting rod 11 is pivotally connected, at one end, to the lever 9, and is pivotally connected, at its other end, to a forked actuating lever 12, the forked end of which is located in a groove 13 in the clutch member 5. A spring 14 is provided to press the clutch member 5 against the clutch member 3 and is compressed by means of the action of the clutch-pedal lever 9 when it is desired to disengage member 5 from member 3. While I have shown a specific design of clutch in order to bring out more clearly the operation of the device embodying my invention, it is to be understood that a clutch of any suitable type may be employed.

A multiple-jaw clutch 15 is provided between the mechanism 8 and the driven member 2. The auxiliary clutch 15 comprises a plurality of members or parts 16 best shown in Fig. 2. One of these parts is mounted upon a shaft 17 and a similar coöperating member 16 is mounted on an intermediate shaft 18 in axial alinement with the shaft 17. Means are provided on the shaft 18 and on the coöperating part 16 mounted thereon, to permit of the part 16 being moved longitudinally of the shaft but to rotate therewith, as, for instance, by means of suitable splines 29. A relatively light spring 19 serves to press the part 16 splined on the shaft 18 into operative engagement with the member 16 mounted upon the short shaft 17. A forked shifting lever 20 is pivotally mounted, at one end, on a suitable stationary part of the case 7 or of its extension 21, and its other end engages a groove 22 in the hub of the movable member 16 mounted on the shaft 18. A two-part connecting link 23, the two portions of which are connected by a turn-buckle 24 in order that its length may be varied, is pivotally connected, at one end, to the lever 20 and at its other end, by means of a lost-motion slot 25, to the clutch pedal lever 9.

The axial surface of each of the projecting jaws 26 of the members 16 is inclined in a circumferential direction for a purpose to be hereinafter set forth. As shown in Fig. 2, these projections are four in number, although any suitable number of such projecting lugs may be employed. The longitudinal face of each of the projections is beveled with respect to the longitudinal face of the main part of the hub of the member 16 and this bevel is so arranged that the longitudinal depth of the lug is greater at the face 27 than at the face 28. In other words, if the member 16 be viewed from the lug end thereof, the longitudinal height of each lug is greater at its left-hand side than at its right-hand side.

The length of the slot 25 in the connecting link 23 may be made such that a forward movement of the clutch pedal lever 9 to separate the members 3 and 5 of the main clutch, will not serve to actuate the lever 20 and the clutch member 16 mounted on the shaft 18 unless and until such movement nearly reaches its permitted maximum. In this way, the main clutch may be operated under ordinary service conditions, if desired, without operating the auxiliary clutch, which latter may be operated under emergency conditions hereinafter to be described.

Under ordinary conditions of operation, particularly when changing from low to intermediate or from intermediate to high gear, it may not be necessary for the average operator to move the clutch pedal lever 9 far enough to disconnect the change-speed gearing 8 from both the driving means 1 and the driven means 2. However, if it is desired to brake the automotive vehicle by means of the engine, the ignition circuit of which may be deënergized, and if an attempt be made to change from high gear to intermediate or even to low gear after a relatively high speed of the vehicle has been attained, as, for instance, in coasting down hill, it may be impossible to successfully accomplish this object if only the main clutch be disconnected. This is because of the fact that the driven means 2 will then actuate a part of the change-speed gears 8 at a relatively high speed, making it either very hard or practically impossible to cause the gears to so mesh as to obtain intermediate speed in the change-speed gearing.

If now, the clutch pedal lever 9 be moved so far forward as to cause the two parts 16 of the multiple-jaw clutch 15 to be disengaged, it becomes relatively easy to change from high to intermediate or even to low speed because there are only relatively light weights embodied in the gear wheels themselves and it becomes relatively easy to cause the gears which are to coöperate to mesh properly. After the gear wheels have been properly meshed, the clutch pedal lever is moved backwardly again, permitting the two coöperating parts 16 to approach each other. However, they do not mesh immediately for the reason that the part 16 mounted on the shaft 17 and connected to the driven means 2 is rotating at a speed which is higher than the rotative speed of the part 16 mounted on the shaft 18 and the axial or longitudinal surface of the jaws 26 immediately adjacent the faces 27 tend to strike each other and thereby maintain the two parts 16 in a spaced-apart relation, substantially as illustrated by the full lines in Fig. 3. It may be noted here that the use of the lost-motion slot 25 in the connecting rod 23 is necessary in order to permit reëngagement of the parts 5 and 3 of the main clutch, even though the two parts 16 of the auxiliary clutch have not yet reached their proper operative position of complete mesh.

If the driving means 1 be caused to increase the speed of all of the mechanism operatively connected thereto, comprising the shaft 4, the main clutch, the shaft 6, the change-speed gearing 8 and the shaft 18 with one of the parts 16 mounted thereon, to a rotative speed equal to the rotative speed of the shaft 17, and if the two parts 16 are in substantially the relative position illustrated by the full lines in Fig. 3, they will not interlock but the movable part 16 on the shaft 18 is caused, by means of the spring 19, to approach the part 16 on the shaft 17 until the axial surfaces of the lugs 26 engage each other. To cause the two parts 16 to interlock it is necessary to momentarily increase the speed of the driving mechanism and consequently the shaft 18 slightly above that of the shaft 17. The projecting jaws 26 on the part 16 mounted on the shaft 18 are thereby caused to advance circumferentially relatively to the lugs 26 on the part 16 mounted on the shaft 17 and when this advance is substantially one quarter of a revolution (in a four jaw clutch), the jaws 26 on the part 16 mounted on the shaft 18 enter the coöperating depressions in the other part 16, occupying substantially the position illustrated by the broken line in Fig. 3. It may be noted in this connection that the bevel on the projecting lugs 26 which previously prevented the proper operative engagement of the two parts, now acts to further such engagement and, hence, the spring 19 need be only a relatively light one which will not add materially to the pressure it is necessary to exert on the clutch pedal lever 9 to operate the same. The spring 19 does not operate to cause a plurality of frictionally-engaged surfaces to carry the driving load, as in the ordinary friction clutch, but operates only to cause a plurality of projecting lugs to again mesh after having been disconnected.

I am aware that similar devices employing friction clutches have been provided but, so far as I know, these devices have not gone into extensive use, apparently for the reason that they were too large and therefore added still further to the weight of the parts which it was necessary to slightly move during the operation commonly known as changing gears. Such devices were also relatively expensive and required an amount of space not easy to find on the usual motor vehicle.

It may be noted that the device embodying my invention provides a relatively simple and light weight means for permitting of manually disconnecting and automatically reconnecting the change-speed gears and the driven means in a motor vehicle, at the will of the operator.

While I have shown a specific embodiment of my invention, various changes may be made therein without departing from the spirit and scope of my invention, and I desire that only such limitations shall be placed thereon as are imposed by the prior art or are specifically set forth in the appended claims.

I claim as my invention:

1. A power transmitting device for automotive vehicles comprising a driving means, a driven means, a plurality of shafts and gear wheels located therebetween and operatively associated therewith, a main clutch located between said driving means and one of said shafts, a multiple-jaw clutch located between said driven means and another of said shafts and embodying means on said clutch jaws for permitting the meshing thereof only when the speed of the clutch member connected to said driven means is substantially equal to, or less than, the speed of the clutch member connected to one of said shafts.

2. A power-transmitting device for automotive vehicles comprising a driving means, a driven means, a plurality of shafts and gear wheels located therebetween and operatively associated therewith, a main clutch located between said driving means and one of said shafts, a multiple-jaw clutch located between said driven means and another of said shafts, embodying means on said clutch jaws for permitting the meshing thereof only when the speed of the clutch member connected to said driven means is substantially equal to, or less than, the speed of the clutch member connected to one of said shafts, and resilient means for causing said jaws to mesh.

3. A driving connection for automotive vehicles comprising a driving member, a driven member, change-speed gearing connected therebetween, a main clutch connected between said driving member and said gearing, a multiple-jaw clutch connected between said driven member and said gearing, a single manually operable means for disengaging both said clutches in predetermined order and for permitting the reëngagement of said clutches in reverse order, embodying means comprising beveled clutch jaw surfaces on said multiple-jaw clutch for permitting the reëngagement thereof only under predetermined relative speed conditions of the coöperating members, and resilient means for causing said reëngagement under said predetermined conditions.

4. In a motor vehicle, the combination with a driving member, a driven member, change-speed gearing operatively connecting said members, and a main clutch for disconnecting said change-speed gearing from said driving member, of a multiple-jaw clutch for disconnecting said change-speed gearing from said driven member, and embodying means on said multiple-jaw clutch comprising beveled axial jaw surfaces for permitting the reconnection of said parts only when the speed of the driven part is equal to, or less than, the speed of the driving part.

5. In a motor vehicle, the combination with a driving member, a driven member, change-speed gearing operatively connecting said members, and a main clutch for disconnecting said change-speed gearing from said driving member, of a multiple-jaw clutch for disconnecting said change-speed gearing from said driven member, the axial jaw surfaces of the multiple-jaw clutch being so beveled as to permit the reconnecting of said parts only under predetermined conditions as to the relative speed of said parts, and resilient means for causing such reconnection.

6. In a motor vehicle, the combination with a driving member, a driven member, change-speed gearing operatively connecting said members and a main clutch for disconnecting said change-speed gearing from said driving member, of a multiple-jaw clutch comprising two intermeshing parts for disconnecting said change-speed gearing from said driven member, and embodying means comprising beveled clutch jaw surfaces on said clutch jaws for permitting the re-meshing of said parts only upon a momentary increase of speed of the part connected to the change-speed gearing relative to the speed of the other part.

7. In a motor vehicle, the combination with a driving member, a driven member, change-speed gearing operatively connecting said members and a main clutch for disconnecting said change-speed gearing from said driving member, of a multiple-jaw clutch comprising two intermeshing parts for disconnecting said change-speed gearing from said driven member, embodying means comprising beveled clutch jaw surfaces on said clutch jaws for permitting the remeshing of said parts only upon a momentary increase of speed of the part connected to the change-speed gearing relative to the speed of the other part, and resilient means for causing said parts to mesh under said conditions.

8. In a motor vehicle, the combination with a driving member, a driven member, change-speed gearing operatively connecting said members, a main clutch for disconnecting said change-speed gearing from said driving member, and a clutch-pedal lever for operating said main clutch, of a multiple-jaw clutch for disconnecting said change-speed gearing from said driven member, means connected to said clutch-pedal lever for actuating said multiple-jaw clutch, embodying means comprising beveled clutch jaw surfaces on said clutch jaws for preventing the meshing of said jaw clutch parts when permitted by said actuating means except under predetermined speed ratio conditions of said jaw clutch parts, and resilient means for causing said parts to mesh under said conditions.

9. In a motor vehicle, the combination with a driving member, a driven member, change-speed gearing connecting said members, a main clutch between said driving member and said gearing, and a clutch-pedal lever for operating said main clutch, of a multiple-jaw clutch between said gearing and the driven member, means for operating said multiple-jaw clutch by said clutch-pedal lever after the clutch pedal lever has been moved a predetermined amount, means for varying the amount of motion of the clutch-pedal lever necessary to cause said multiple-jaw clutch to be operated, embodying means comprising beveled clutch jaw surfaces for permitting the reëngagement of said multiple-jaw clutch parts only upon a momentary increase of speed of one part relative to the other and resilient means for causing said parts to mesh under said conditions.

In testimony whereof, I have hereunto subscribed my name this 12th day of August, 1920.

JOHN A. STUMPENHORST.